US010034258B2

(12) United States Patent
Dal Maistro et al.

(10) Patent No.: US 10,034,258 B2
(45) Date of Patent: Jul. 24, 2018

(54) SIGNAL DETECTOR DEVICE AND METHOD

(71) Applicant: Infineon Technologies AG, Neubiberg (DE)

(72) Inventors: Daniele Dal Maistro, Villach (AT); Marc Tiebout, Finkenstein (AT)

(73) Assignee: INFINEON TECHNOLOGIES AG, Neubiberg (DE)

(*) Notice: Subject to any disclaimer, the term of this patent is extended or adjusted under 35 U.S.C. 154(b) by 209 days.

(21) Appl. No.: 15/197,331

(22) Filed: Jun. 29, 2016

(65) Prior Publication Data

US 2018/0007649 A1    Jan. 4, 2018

(51) Int. Cl.
*H04L 1/20* (2006.01)
*H04W 56/00* (2009.01)
*H04B 7/06* (2006.01)
*H04L 5/00* (2006.01)
*H04L 1/24* (2006.01)

(52) U.S. Cl.
CPC ...... *H04W 56/0035* (2013.01); *H04B 7/0617* (2013.01); *H04L 1/246* (2013.01); *H04L 5/005* (2013.01)

(58) Field of Classification Search
CPC ... H04W 56/0035; H04L 1/246; H04B 7/0617
See application file for complete search history.

(56) References Cited

U.S. PATENT DOCUMENTS

| | | | |
|---|---|---|---|
| 2004/0213364 A1* | 10/2004 | Mallinson | H03H 17/027 375/343 |
| 2011/0116558 A1* | 5/2011 | Otaka | H03F 1/34 375/259 |
| 2016/0094256 A1* | 3/2016 | Papotto | H03F 3/24 375/316 |

* cited by examiner

*Primary Examiner* — Lakeram Jangbahadur
(74) *Attorney, Agent, or Firm* — Slater Matsil, LLP

(57) ABSTRACT

A signal detector device and method includes a quadrature demodulator configured to receive an input signal, a first reference signal, and a second reference signal in quadrature with the first reference signal, the quadrature demodulator further configured to produce a plurality of output signals from the input signal and the first and the second reference signal, the plurality of output signals indicating the amplitude and phase of the input signal, and one or more inverting circuits, the inverting circuits having a first and a second programmable output polarity, the plurality of output signals being output by the quadrature demodulator when the inverting circuits are set to the first programmable output polarity, the plurality of output signals being inverted and output by the quadrature demodulator when the inverting circuits are set to the second programmable output polarity.

17 Claims, 8 Drawing Sheets

SIGNAL DETECTOR DEVICE AND METHOD

TECHNICAL FIELD

The present invention relates generally to signal analysis, and, in particular embodiments, to a signal detector device and method.

BACKGROUND

Communication, biomedical, and radar systems often measure the amplitude and phase of an analog signal. For example, wireless transmitters and receivers that include beamforming arrays may measure the amplitude and phase of received signals in each RF device of the beamforming chain. Wireless devices such as base stations and access points, handheld devices such as phones and tablets, and personal computers may all need to measure the amplitude and phase of received signals. Such measurements typically require a high accuracy and are often performed in a small device or package.

Accurate measurements of a signal's amplitude and phase may be performed using vector network analyzers (VNAs). Such measurement systems may offer higher accuracy, but often require the use of analog-to-digital converters (ADCs), higher performance intermediate frequency (IF) sampling, and additional memory and digital signal processors (DSPs). Furthermore, VNAs may increase the cost and size of systems through the use of special RF boards and connectors, as well as the presence of an operator to perform the measurements.

Integrated analog systems that perform amplitude and phase detection have grown in popularity as technology has improved and the trend towards integration has continued. Analog systems have the potential to reduce device areas by having fewer components. However, traditionally, the accuracy of analog systems may be improved by increasing the size of components in the system, which may increase power consumption of the system. Increasing the size of components or the power consumption may increase the accuracy, but may increase chip area, reduce efficiency, or be encumbered by other technology constraints. Further, sometimes the device improvement may be insufficient to achieve the desired performance.

SUMMARY

In accordance with a preferred embodiment of the present invention, a device includes: a quadrature demodulator configured to receive an input signal, a first reference signal, and a second reference signal in quadrature with the first reference signal, the quadrature demodulator further configured to produce a plurality of output signals from the input signal and the first and the second reference signal, the plurality of output signals indicating the amplitude and phase of the input signal; and one or more inverting circuits, the inverting circuits having a first and a second programmable output polarity, the plurality of output signals being output by the quadrature demodulator when the inverting circuits are set to the first programmable output polarity, the plurality of output signals being inverted and output by the quadrature demodulator when the inverting circuits are set to the second programmable output polarity.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

The making and using of various embodiments are discussed in detail below. It should be appreciated, however, that the various embodiments described herein are applicable in a wide variety of specific contexts. The specific embodiments discussed are merely illustrative of specific ways to make and use various embodiments, and should not be construed in a limited scope.

According to various embodiments, programmable buffers are included in a quadrature demodulator to invert the input or reference signals of the quadrature demodulator. The outputs of the quadrature demodulator are measured once, the input or reference signals are inverted, and the outputs are measured again. Inverting the input or reference signals inverts the output of the quadrature demodulator, but does not invert the effects of errors on the output. DC offset or quadrature error of the demodulator may be calculated using the values of the normal and inverted outputs, and these calculated error values may be used to correct the effect of the errors during normal operation of the demodulator.

Figure 1:
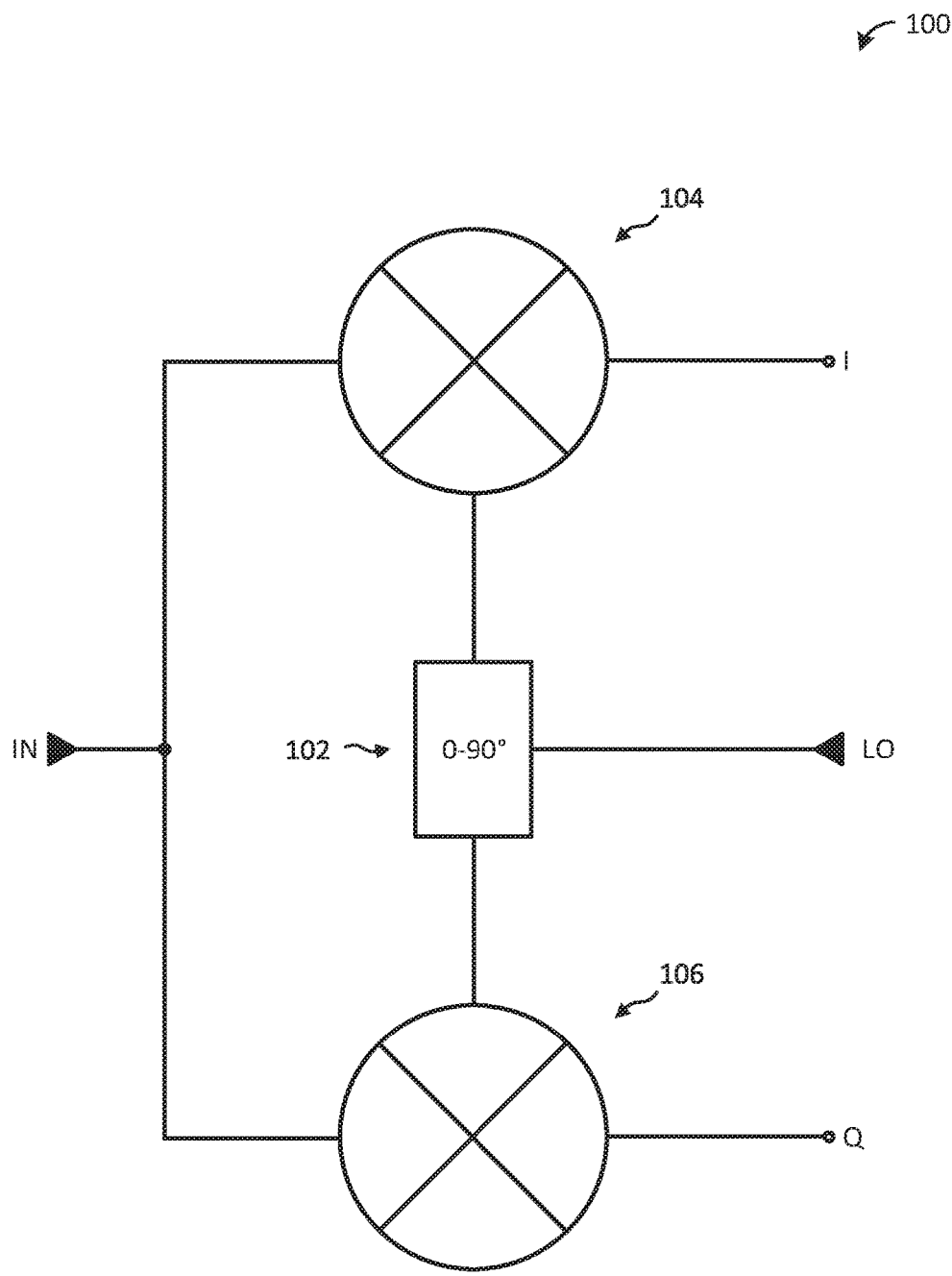
FIGS. 1-3 show signal detectors.

FIG. 1 shows a signal detector 100. The signal detector 100 is a quadrature demodulator that determines the amplitude and phase of an input signal IN. The signal detector 100 includes a quadrature generator 102, and mixers 104, 106. During operation, the signal detector 100 receives a reference signal LO on an input terminal, and provides output signals I and Q on output terminals.

The quadrature generator 102 is clocked by the reference signal LO and has two outputs. The quadrature generator 102 drives the mixers 104, 106 with reference signals that have a 90 degree phase shift between each other. In some embodiments, the quadrature generator 102 is implemented using a 2:1 current mode logic (CML) divider that supplies the reference signals at half the frequency of the reference signal LO. In some embodiments, the quadrature generator 102 may be, e.g., a polyphase filter, a 3 dB quadrature hybrid coupler, a bipolar or MOS-based divider, a phase shifter, or the like.

The mixer 104 multiplies the reference signal provided by the quadrature generator 102 with the input signal IN and produces the output signal I. The mixer 106 multiplies the reference signal provided by the quadrature generator 102 with the input signal IN and produces the output signal Q. In some embodiments, the mixers 104, 106 are implemented using double-balanced Gilbert cells. In some embodiments, the mixers 104, 106 may be, e.g., bipolar or MOS-based Gilbert mixers, passive mixers, voltage mode mixers, current mode mixers, or the like.

When the input signal IN and the reference signals produced by the quadrature generator 102 have the same frequency, the output signals I and Q are direct current (DC) signals, and contain information about the amplitude and phase of the input signal IN. In particular, the output signal I is determined according to $$I = G_{mix}A_{IN}\cos(\phi_{LO}-\phi_{IN}), \text{ and} \qquad (1)$$

$$Q = G_{mix}A_{IN}\sin(\phi_{LO}-\phi_{IN}), \qquad (2)$$

where $G_{mix}$ is the gain of the mixers 104, 106, $A_{IN}$ is the amplitude of the input signal IN, $\phi_{IN}$ is the phase of the input signal IN, and $\phi_{LO}$ is the phase of the reference signal LO. The output signals I and Q may be sampled with an ADC, and the amplitude and phase of the input signal IN may be determined by solving for $A_{IN}$ and $\phi_{1N}$ according to $$G_{mix}A_{IN} = \sqrt{I^2+Q^2}, \text{ and} \qquad (3)$$

$$\phi_{LO}-\phi_{IN} = \tan^{-1}\left(\frac{Q}{I}\right). \qquad (4)$$

Although Equation (4) indicates the variation of $\phi_{LO}-\phi_{IN}$ with respect to a starting value, and not the absolute value of the phase $\phi_{IN}$, it should be appreciated that, in some contexts, the relative phase may be sufficient information to perform device verification, calibration, and the like.

Non-ideal operation of basic circuit elements in the signal detector 100 may affect the accuracy of the amplitude and phase measurement. For example, the output signals I and Q may have an additional DC offset, and the quadrature generator 102 may experience quadrature errors, e.g., the quadrature generator 102 may not produce signals with a phase shift of precisely 90 degrees. Such errors may corrupt the amplitude and phase information in the output signals I and Q. Increasing the size of the circuit elements in the signal detector 100 may increase the accuracy of the output signals I and Q, but also may increase the size and power consumption of the signal detector 100.

Figure 2:
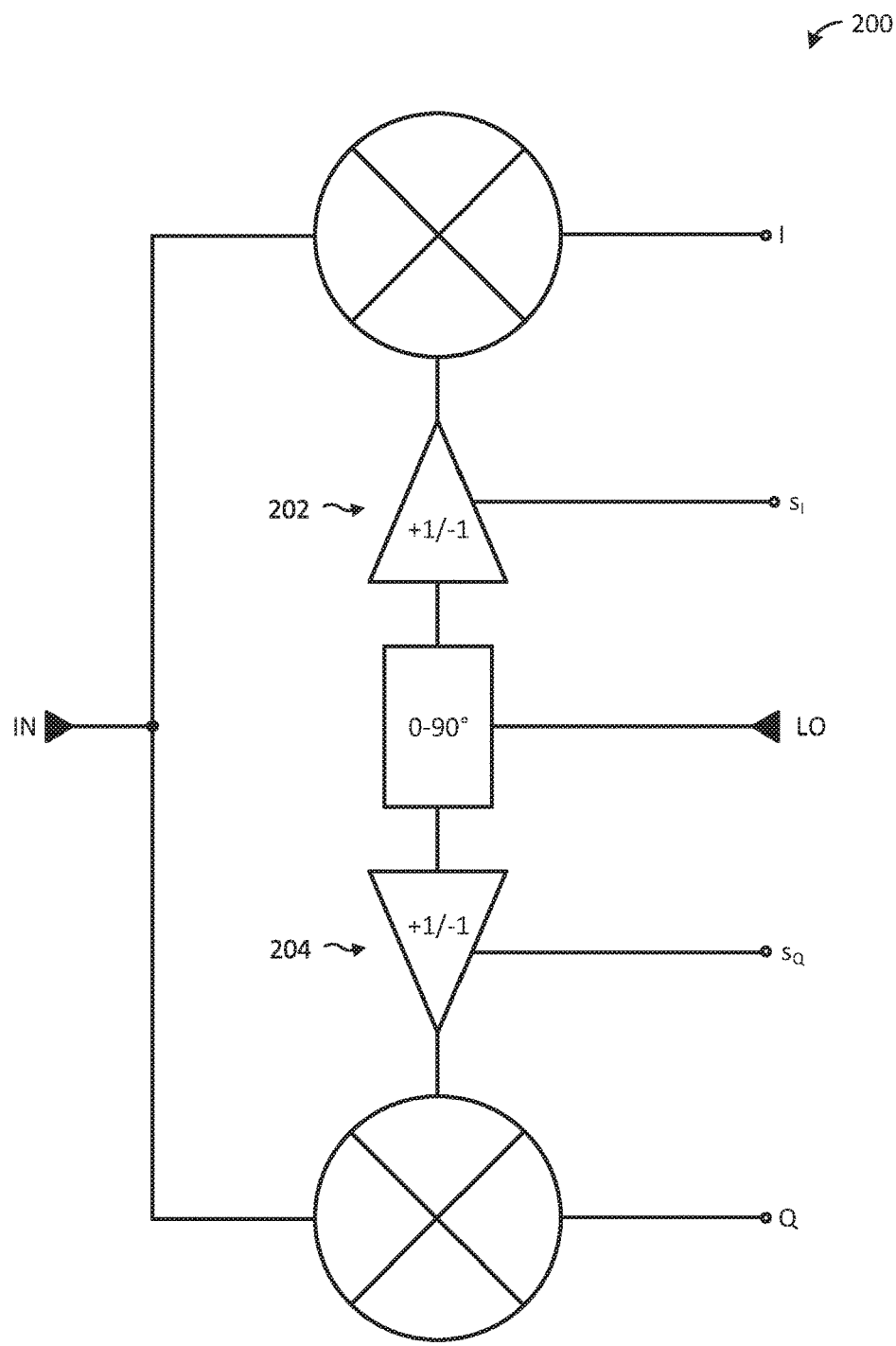

FIG. 2 shows a signal detector 200, according to an embodiment of the present invention. The signal detector 200 is similar to the signal detector 100, except that the signal detector 200 includes inverters 202, 204 between the quadrature generator 102 and the mixers 104, 106. The inverters 202, 204 are programmable buffers that invert the reference signals produce by the quadrature generator 102, e.g., shift their phases by 180 degrees, when the swap signals $s_I$ and $s_Q$ are active. Although the inverters 202, 204 may not produce a phase shift of precisely 180, inverting errors of the inverters 202, 204 may be significantly smaller than expected errors in the signal detector 200 (discussed above).

Inverting the reference signals LO inverts the output signals I and Q. However, the errors discussed above (e.g., DC offset, quadrature inaccuracies) are not inverted when the output signals I and Q are inverted. As a result, errors in the signal detector 200 may be determined by measuring the output signals I and Q once with the inverters deactivated and again with the inverters activated, and then performing post-processing calculations with the acquired data to compute the errors. Determining errors with post-processing calculations allows the signal detector 200 to more accurately measure the amplitude and phase of the input signal IN without significantly increasing the device area or impacting power efficiency. Although post-processing may increase measurement time, measurement time is typically not a critical parameter, as measurements may be performed only during a calibration sequence and not during regular operation.

The DC offset of the signal detector 200 may be determined by varying the phase $\phi_{LO}$ or $\phi_{IN}$ and measuring the output signals I and Q for different values of the phase difference $\phi_{LO}-\phi_{IN}$ (where $\phi_{LO}-\phi_{IN} \in [0, 360]$), inverting the reference signals LO, and again measuring the output signals I and Q while varying the phase. The normal and inverted values of the output signals I and Q are averaged to yield a DC offset for each measured phase difference. In some embodiments, the DC offset for a particular phase difference may be selected. In some embodiments, the DC offsets for each phase difference are averaged to yield an overall average DC offset for the signal detector. The overall average DC offset may then be the only offset selected. Once an offset is selected, it is subtracted from the output signals I and Q when determining the amplitude and phase of the input signal IN during normal operation.

The quadrature error of the signal detector 200 may be determined by taking the same measurements used to determine the DC offset. The zero-crossing points of the normal and inverted values of the output signals I and Q are determined. Some interpolation may be needed to determine the zero-crossing points. The values at the zero-crossing points may then be subtracted to determine the quadrature error. The quadrature error may be accounted for when determining the phase difference $\phi_{LO}-\phi_{IN}$.

Figure 3:
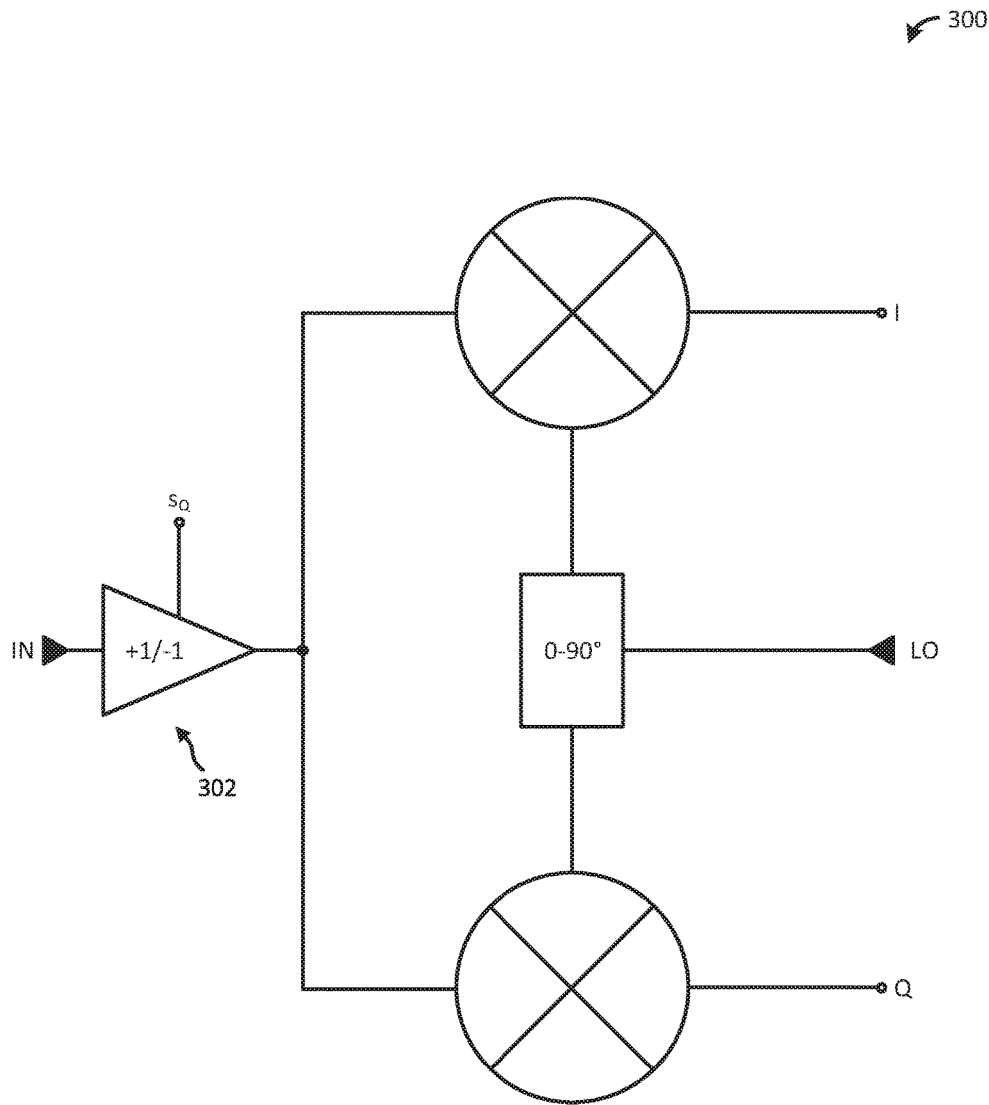

FIG. 3 shows a signal detector 300, according to an embodiment of the present invention. The signal detector 300 is similar to the signal detector 200, except that the signal detector 300 includes an inverter 302 that inverts the input signal IN instead of the reference signals LO. Inverting the input signal IN also inverts the output signals I and Q without inverting the errors in the signal detector 300 (e.g., DC offset, quadrature inaccuracies). The inverter 302 is similar to the inverters 202, 204. The signal detector 300 requires fewer inverters than the signal detector 200.

Figure 4:
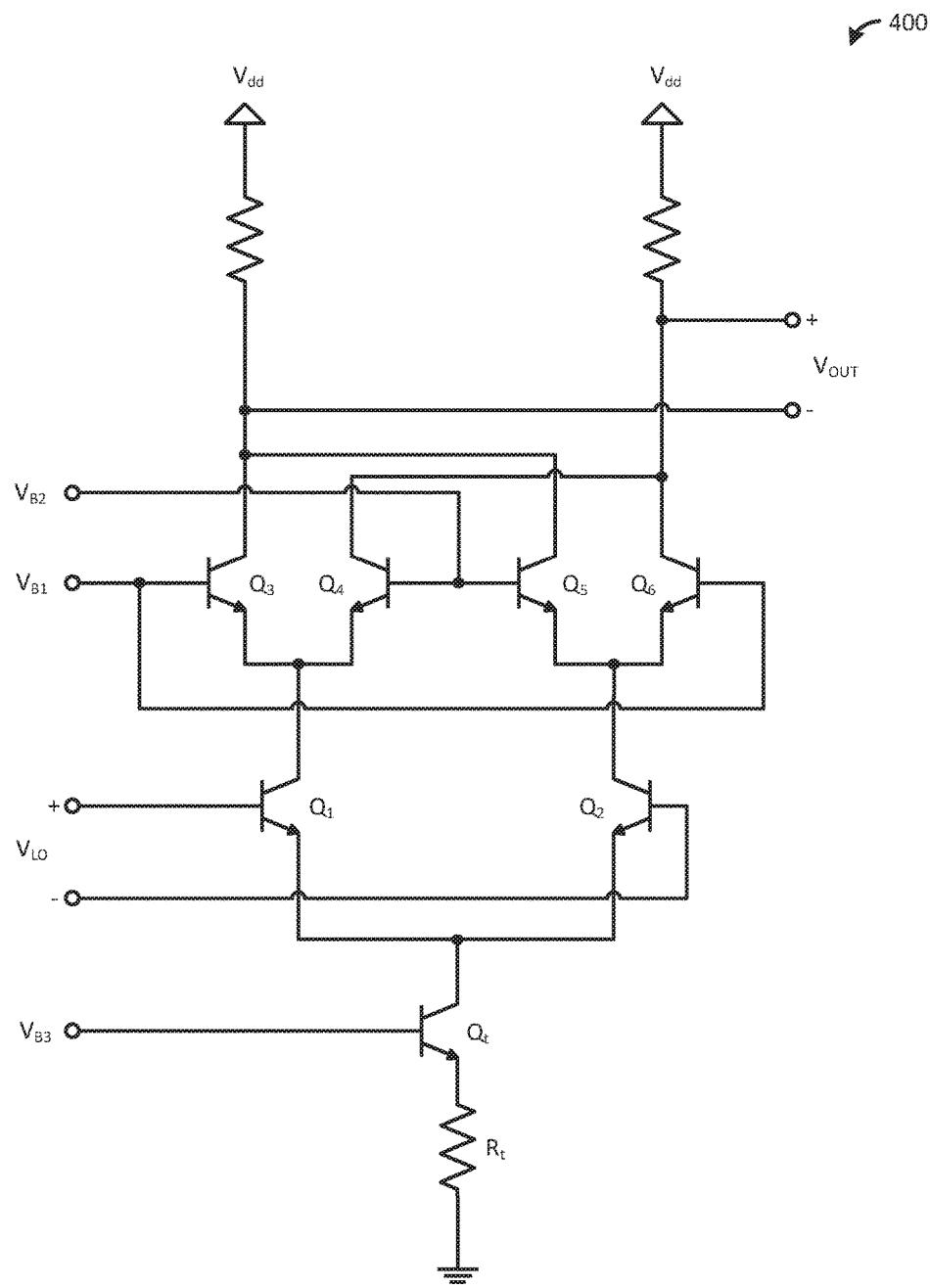
FIG. 4 shows an inverter.

FIG. 4 shows an inverter 400. The inverter 400 may be a detailed view of the inverters 202, 204, 302. The inverter 400 is an inverting/non-inverting buffer that includes transistors $Q_1$-$Q_6$. The transistors $Q_1$-$Q_2$ are configured as a differential pair, and the transistors $Q_3$-$Q_6$ are biased with biasing inputs $V_{B1}$ and $V_{B2}$ to perform signal inversion. When the biasing input $V_{B1}$ is driven, the current generated by the transistors $Q_1$ and $Q_2$ flows through the transistors $Q_3$ and $Q_6$, while the transistors $Q_4$ and $Q_5$ remain off. Conversely, when the biasing input $V_{B2}$ is driven, the current generated by the transistors $Q_1$ and $Q_2$ flows through the transistors $Q_4$ and $Q_5$, while the transistors $Q_3$ and $Q_6$ remain off. In some embodiments, the biasing inputs $V_{B1}$ and $V_{B2}$ are driven by a CML inverter. The transistor $Q_t$ and resistor $R_t$ act as a current source with $V_{B3}$ as a biasing voltage.

Although the preceding devices have been described with respect to particular circuit elements, it should be appreciated that other mixers, inverters, dividers, and the like could be used. For example, in some embodiments the circuit elements could be MOS devices. Additionally, the elements could be configured in other circuit topologies without changing the principle of operation. For example, in some embodiments the inverters could be implemented in the quadrature generator 102 or the topologies of the mixers 104, 106. Further, although the errors have been discussed with respect to DC offset and quadrature errors, it should be appreciated that other error types could also be determined according to various embodiments.

Figure 5:
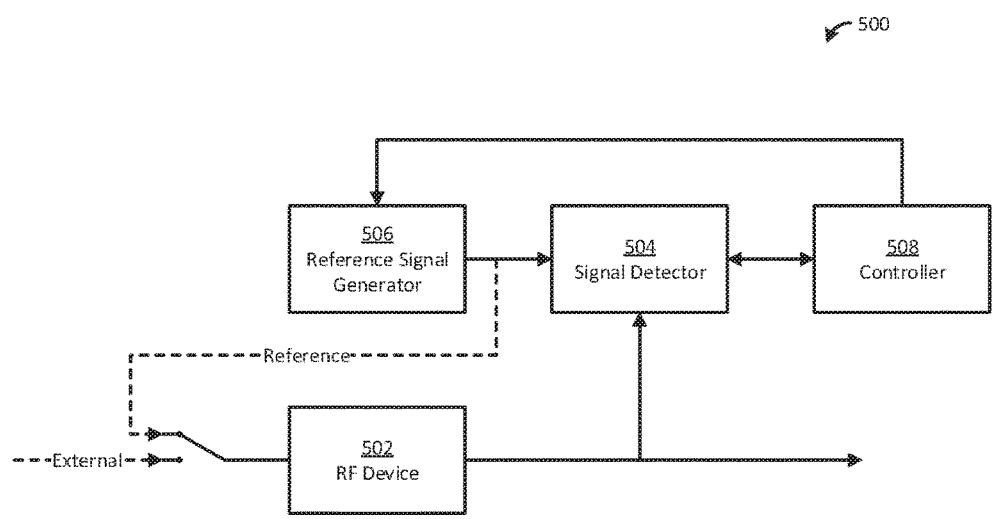
FIG. 5 shows a receiver.

FIG. 5 shows a receiver 500 with integrated error detection, according to an embodiment of the present invention. Integrated error detection is used for device calibration and/or testing. The receiver 500 may be part of a system that requires efficient beamforming phased arrays, such as radar and communications systems such as 5G. The receiver 500 includes a RF device 502, a signal detector 504, a reference signal generator 506, and a controller 508.

The RF device 502 is a device that produces a signal to be characterized by the system. The output of the RF device 502 is the input signal IN. In some embodiments, the RF device 502 is a single RF channel. In some embodiments, the RF device 502 is one of several devices, such as an RF chain in a beamforming array. As shown in FIG. 5, the RF device 502 may be fed by an external source or by the reference signal generator 506.

The signal detector 504 evaluates the response of the input signal IN from the RF device 502. The signal detector 504 may be implemented using embodiments such as the signal detector 200, 300. The output signals I and Q produced by the signal detector 504 contain information about the amplitude and phase of the input signal IN. In some embodiments, the signal detector 504 may be part of the RF device 502.

The reference signal generator 506 provides the reference signal LO to the signal detector 504. In some embodiments, the reference signal LO may be produced by the same source feeding the RF device 502, e.g., the reference signal LO and the input signal IN of the signal detector 504 may be derived from the same source. In some embodiments, the reference signal generator 506 provides the reference signal LO independent of the RF device 502.

The controller 508 is coupled to the signal detector 504 and the reference signal generator 506. The controller 508 may be a microcontroller, microprocessor, DSP, digital logic device, or the like, and controls the phase shift introduced by the RF device 502. In some embodiments, the controller 508 may also control the reference signal LO produced by the reference signal generator 506. The controller 508 is configured to perform a sweep of all values of the phase difference $\phi_{LO}-\phi_{IN}$, and measure the output signals I and Q of the signal detector 504 for each phase difference. The controller 508 then inverts either the input signal IN or the reference signals LO by controlling the signal detector 504, and again performs a phase sweep to measure the output signals I and Q. The controller 508 determines the values of errors in the signal detector 504 according to the embodiment techniques discussed above, using the normal and inverted values of I and Q. The calculated errors are used by the controller 508 to more accurately compute the amplitude and phase of the input signal IN. In some embodiments, the controller 508 provides a calibration signal to the signal detector 504 to compensate for the values of the errors (e.g., DC offset and quadrature error).

Figure 6:
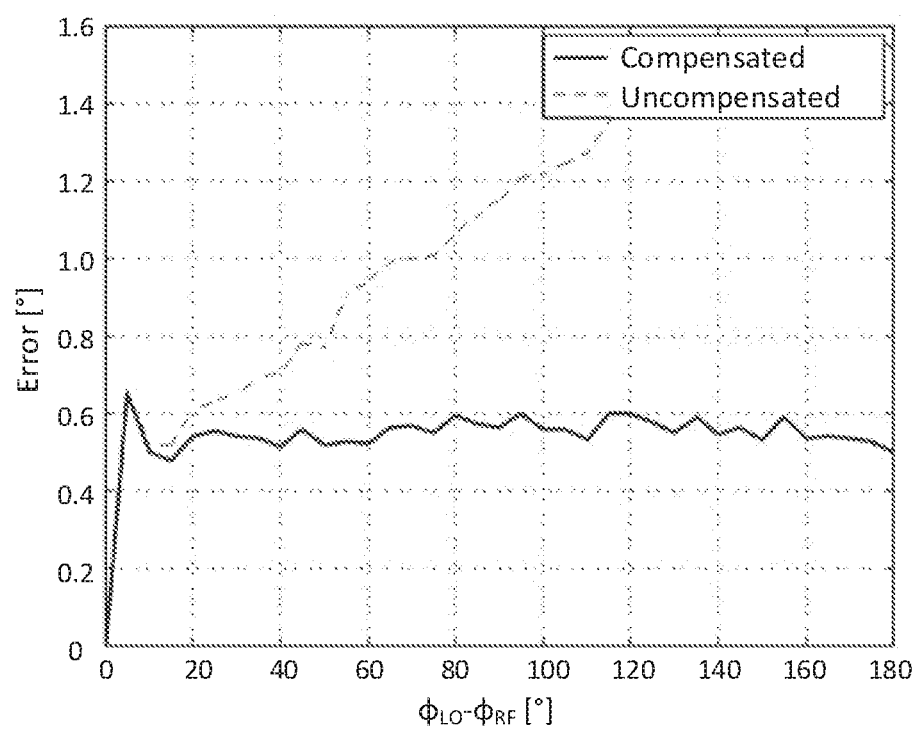
FIG. 6 shows results measured from an example embodiment.

FIG. 6 shows results measured from an example embodiment. As shown, the compensated phase measurements have a lower standard deviation of error compared to uncompensated measurements. The calculated error values themselves may include some error due to quantization effects of ADCs on the controller. In some embodiments, the controller accounts for these quantization effects when determining the values of errors. Although FIG. 6 shows compensated phase measurements, similarly improved results may be achieved for compensated amplitude measurements.

Figure 7:
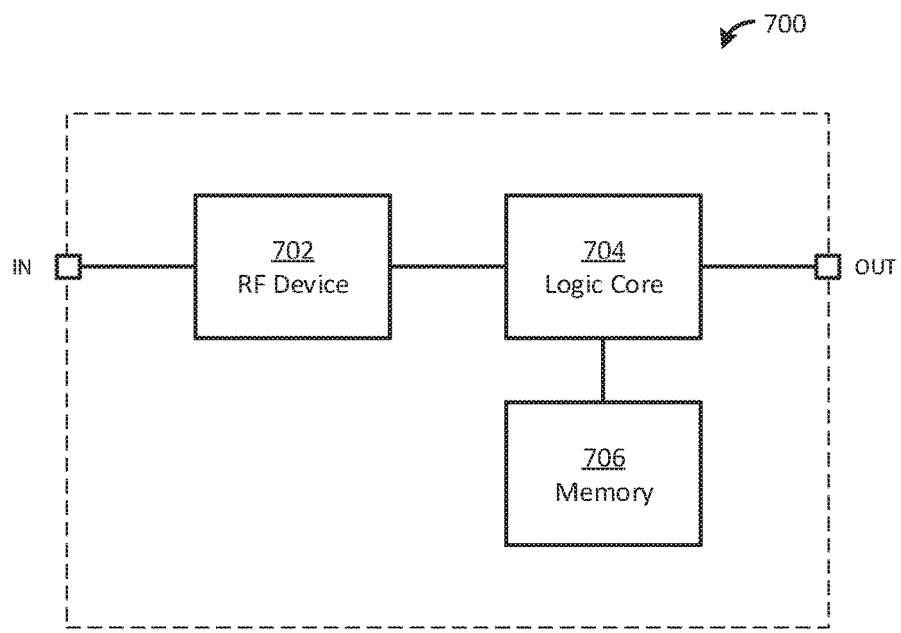
FIG. 7 is a block diagram of a wireless device.

FIG. 7 is a block diagram of a wireless device 700, according to an embodiment of the present invention. The wireless device 700 includes an RF device 702, a logic core 704, and memory 706. The RF device 702 produces an input signal and measures the amplitude and phase of the input signal. In some embodiments, the RF device 702 includes both an RF receiver and a signal detector. The logic core 704 is coupled to the RF device 702, and comprises an analog or digital device such as a microcontroller. The RF device 702 produces DC outputs that indicate the amplitude and phase of the input signal, and the logic core 704 measures the DC outputs. According to some embodiments, the logic core 704 determines error values in the RF device 702 by inverting the DC outputs and comparing the inverted DC outputs to the non-inverted DC outputs. The logic core 704 determines coefficients that indicate the errors in the RF device 702 and stores the coefficients in the memory 706, which may comprise, e.g., random-access memory (RAM), flash memory, or the like. Once the coefficients are determined and stored, they may be reused to correct subsequent determinations of the amplitude and phase of the input signal.

Figure 8:
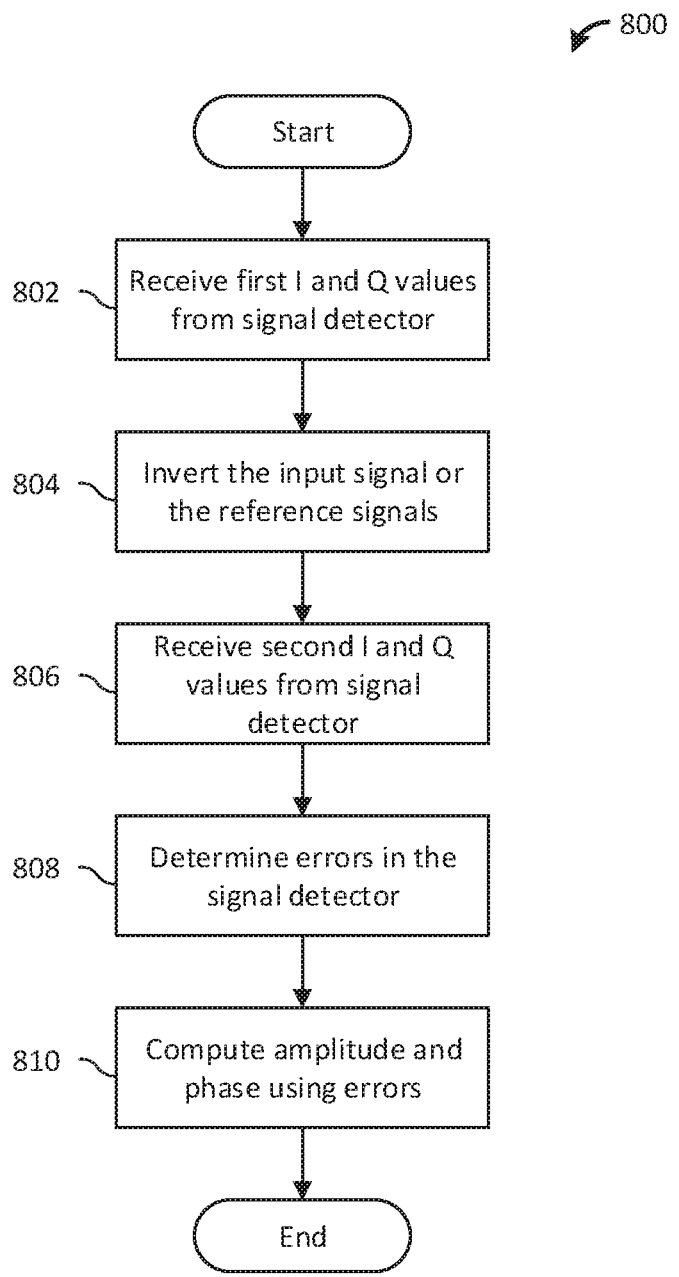
FIG. 8 is a flow diagram of a device calibration method.

FIG. 8 is a flow diagram of a device calibration method 800. The device calibration method 800 may be indicative of operations occurring on devices in the receiver 500, such as the controller 508.

The controller receives first I and Q values from a signal detector (step 802). The signal detector may be, e.g., the signal detector 504. The first I and Q values may be single values, or may be ranges of values determined while sweeping the phase difference $\phi_{LO}-\phi_{IN}$.

The controller inverts the input signal IN or the reference signals LO for the signal detector (step 804). The signals may be inverted by programming a device such as the inverter 400 in the path of the input signal IN or the reference signals LO. The inverter may be controlled by the controller with a logic-level line.

The controller receives second I and Q values from the signal detector (step 806). The second I and Q values may be received in a manner similar to receiving the first I and Q values.

The controller determines the errors in the signal detector (step 808). The errors are determined using the first and second I and Q values. Determining the errors may include computing the DC offset and quadrature error of the signal detector using techniques discussed above.

The controller computes the amplitude and phase of the input signal IN using the errors in the signal detector and I and Q values from the signal detector (step 810). For example the controller may determine the amplitude and phase using the I and Q values, and then correct the values in a post-processing step.

In accordance with a preferred embodiment of the present invention, a device includes: a quadrature demodulator configured to receive an input signal, a first reference signal, and a second reference signal in quadrature with the first reference signal, the quadrature demodulator further configured to produce a plurality of output signals from the input signal and the first and the second reference signal, the plurality of output signals indicating the amplitude and phase of the input signal; and one or more inverting circuits, the inverting circuits having a first and a second programmable output polarity, the plurality of output signals being output by the quadrature demodulator when the inverting circuits are set to the first programmable output polarity, the plurality of output signals being inverted and output by the quadrature demodulator when the inverting circuits are set to the second programmable output polarity.

In some embodiments, the quadrature demodulator includes a quadrature generator, the quadrature generator including the one or more inverting circuits. In some embodiments, the quadrature demodulator includes a plurality of mixers, the plurality of mixers including the one or more inverting circuits. In some embodiments, the one or more inverting circuits are programmable inverters, the programmable inverters being coupled to the quadrature demodulator. In some embodiments, the one or more inverting circuits invert the input signal when the inverting circuits are set to the second programmable output polarity. In some embodiments, the one or more inverting circuits invert the first and the second reference signal when the inverting circuits are set to the second programmable output polarity. In some embodiments, the device further includes a controller coupled to the quadrature demodulator, the controller configured to determine the amplitude and phase of the input signal according to the plurality of output signals. In some embodiments, the one or more inverting circuits are configured to be coupled to the controller, the controller further configured to set the inverting circuits to the first programmable output polarity while determining first values of the plurality of output signals, to set the inverting circuits to the second programmable output polarity while determining second values of the plurality of output signals, and to determine one or more error values from the first and the second values of the plurality of output signals. In some embodiments, the controller is further configured to determine the error values by subtracting the first values of the plurality of output signals from the second values of the plurality of output signals. In some embodiments, the error values indicate a DC offset of the quadrature demodulator. In some embodiments, the error values indicate a quadrature error of the quadrature demodulator.

In accordance with a preferred embodiment of the present invention, a method includes: measuring, by a controller, first values of a plurality of output signals from a radio frequency (RF) signal detector, the first values of the plurality of output signals indicating the amplitude and phase of an input signal of the RF signal detector according to a plurality of reference signals; inverting, by the controller, one of the input signal or the plurality of reference signals; measuring, by the controller, second values of the plurality of output signals from the RF signal detector; and determining, by the controller, one or more error values of the RF signal detector according to the first values of the plurality of output signals and the second values of the plurality of output signals.

In some embodiments, the inverting includes inverting the input signal. In some embodiments, the inverting includes inverting the plurality of reference signals. In some embodiments, the determining includes subtracting the second values of the plurality of output signals from respective ones of the first values of the plurality of output signals to produce the one or more error values. In some embodiments, the determining further includes averaging the one or more error values to produce a final error value. In some embodiments, the method further includes: storing, by the controller, coefficients indicating the one or more error values of the RF signal detector; determining, by the controller, the amplitude and phase of the input signal according to the plurality of output signals; and correcting, by the controller, the amplitude and phase of the input signal according to the coefficients. In some embodiments, the one or more error values include a DC offset of the RF signal detector, and a quadrature error of the RF signal detector. In some embodiments, the first and second values of the plurality of output signals are determined at different relative phases of the input signal and the plurality of reference signals.

In accordance with a preferred embodiment of the present invention, a system includes: a radio frequency (RF) device including one or more inverters, the RF device configured to receive an input signal and a reference signal, and to produce a first output signal and a second output signal according to the amplitude and phase of the input signal, the RF device configured to invert the first output signal and the second output signal according to programmed values of the one or more inverters; a processor coupled to the RF device, the processor configured to measure the first output signal and the second output signal, to invert the first output signal and the second output signal with the one or more inverters, to measure the inverted first output signal and the inverted second output signal, and to determine error values of the RF device according to the first output signal, the second output signal, the inverted first output signal, and the inverted second output signal; and memory coupled to the processor, the memory configured to store coefficients indicating the error values of the RF device.

In some embodiments, the one or more inverters are configured to invert the input signal. In some embodiments, the one or more inverters are configured to invert the reference signal. In some embodiments, the processor is further configured to determine the amplitude and phase of the input signal according to the first output signal and the second output signal, and to correct the determined amplitude and phase according to the coefficients.

An advantage of an embodiment of the present invention includes the ability to be implemented on an RF device for performing both functional tests and run-time calibration of the RF device. Such features may also be useful in downstream RF and communications devices, such as beamforming arrays.

Although this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A device comprising:
   a quadrature demodulator configured to receive an input signal, a first reference signal, and a second reference signal in quadrature with the first reference signal, the quadrature demodulator further configured to produce a plurality of output signals from the input signal and the first and the second reference signal, the plurality of output signals indicating the amplitude and phase of the input signal;
   one or more inverting circuits, the inverting circuits having a first and a second programmable output polarity, the plurality of output signals being output by the quadrature demodulator when the inverting circuits are set to the first programmable output polarity, the plurality of output signals being inverted and output by the quadrature demodulator when the inverting circuits are set to the second programmable output polarity; and
   a controller coupled to the quadrature demodulator, the one or more inverting circuits being configured to be coupled to the controller, the controller configured to determine the amplitude and phase of the input signal according to the plurality of output signals, to set the inverting circuits to the first programmable output polarity while determining first values of the plurality of output signals, to set the inverting circuits to the second programmable output polarity while determining second values of the plurality of output signals, to determine one or more error values from the first and the second values of the plurality of output signals, and to determine the error values by subtracting the first values of the plurality of output signals from the second values of the plurality of output signals.

2. The device of claim 1, wherein the quadrature demodulator comprises a quadrature generator, the quadrature generator including the one or more inverting circuits.

3. The device of claim 1, wherein the quadrature demodulator comprises a plurality of mixers, the plurality of mixers including the one or more inverting circuits.

4. The device of claim 1, wherein the one or more inverting circuits are programmable inverters, the programmable inverters being coupled to the quadrature demodulator.

5. The device of claim 1, wherein the one or more inverting circuits invert the input signal when the inverting circuits are set to the second programmable output polarity.

6. The device of claim 1, wherein the one or more inverting circuits invert the first and the second reference signal when the inverting circuits are set to the second programmable output polarity.

7. The device of claim 1, wherein the error values indicate a DC offset of the quadrature demodulator.

8. The device of claim 1, wherein the error values indicate a quadrature error of the quadrature demodulator.

9. A method comprising:
measuring, by a controller, first values of a plurality of output signals from a radio frequency (RF) signal detector, the first values of the plurality of output signals indicating the amplitude and phase of an input signal of the RF signal detector according to a plurality of reference signals;
inverting, by the controller, one of the input signal or the plurality of reference signals;
measuring, by the controller, second values of the plurality of output signals from the RF signal detector;
determining, by the controller, one or more error values of the RF signal detector according to the first values of the plurality of output signals and the second values of the plurality of output signals,
wherein the determining comprises subtracting the second values of the plurality of output signals from respective ones of the first values of the plurality of output signals to produce the one or more error values;
storing, by the controller, coefficients indicating the one or more error values of the RF signal detector;
determining, by the controller, the amplitude and phase of the input signal according to the plurality of output signals; and
correcting, by the controller, the amplitude and phase of the input signal according to the coefficients.

10. The method of claim 9, wherein the inverting comprises inverting the input signal.

11. The method of claim 9, wherein the inverting comprises inverting the plurality of reference signals.

12. The method of claim 9, wherein the determining further comprises averaging the one or more error values to produce a final error value.

13. The method of claim 9, wherein the one or more error values include a DC offset of the RF signal detector, and a quadrature error of the RF signal detector.

14. The method of claim 9, wherein the first and second values of the plurality of output signals are determined at different relative phases of the input signal and the plurality of reference signals.

15. A system comprising:
a radio frequency (RF) device comprising one or more inverters, the RF device configured to receive an input signal and a reference signal, and to produce a first output signal and a second output signal according to the amplitude and phase of the input signal, the RF device configured to invert the first output signal and the second output signal according to programmed values of the one or more inverters;
a processor coupled to the RF device, the processor configured to determine the amplitude and phase of the input signal according to the first output signal and the second output signal, to invert the first output signal and the second output signal with the one or more inverters, to measure the inverted first output signal and the inverted second output signal, to determine coefficients indicating error values of the RF device by subtracting the inverted first output signal from the first output signal and by subtracting the inverted second output signal from the second output signal, and to correct the determined amplitude and phase according to the coefficients; and
memory coupled to the processor, the memory configured to store the coefficients indicating the error values of the RF device.

16. The system of claim 15, wherein the one or more inverters are configured to invert the input signal.

17. The system of claim 15, wherein the one or more inverters are configured to invert the reference signal.

* * * * *